United States Patent
Sun

(10) Patent No.: US 9,172,554 B2
(45) Date of Patent: Oct. 27, 2015

(54) METHOD AND NETWORK ACCESS DEVICE FOR ENABLING DATA FORWARDING BETWEEN DIFFERENT PHYSICAL MEDIUMS

(75) Inventor: Yaquan Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 202 days.

(21) Appl. No.: 13/578,260

(22) PCT Filed: Sep. 2, 2010

(86) PCT No.: PCT/CN2010/076578
§ 371 (c)(1),
(2), (4) Date: Aug. 10, 2012

(87) PCT Pub. No.: WO2011/156990
PCT Pub. Date: Dec. 22, 2011

(65) Prior Publication Data
US 2012/0307824 A1    Dec. 6, 2012

(30) Foreign Application Priority Data
Jun. 17, 2010    (CN) .......................... 2010 1 0202043

(51) Int. Cl.
*H04L 12/66* (2006.01)
*H04L 12/28* (2006.01)
*H04L 12/46* (2006.01)
*H04W 76/02* (2009.01)

(52) U.S. Cl.
CPC ........ *H04L 12/2859* (2013.01); *H04L 12/4633* (2013.01); *H04W 76/022* (2013.01)

(58) Field of Classification Search
CPC ... H04L 12/2859; H04L 63/08; H04W 16/00; H04W 12/06; H04W 80/04; H04W 84/005; H04B 7/18506; G06F 12/0223
USPC ......... 370/253, 254, 389, 338, 331, 401, 328, 370/310, 335, 395.5; 709/229, 207; 455/405, 436, 426.1; 713/159
See application file for complete search history.

(56) References Cited

U.S. PATENT DOCUMENTS

| | | | |
|---|---|---|---|
| 2004/0044789 A1 | 3/2004 | Angel | |
| 2004/0139201 A1 | 7/2004 | Chaudhary et al. | |

(Continued)

FOREIGN PATENT DOCUMENTS

| | | |
|---|---|---|
| CN | 1671119 A | 9/2005 |
| CN | 1674579 A | 9/2005 |

(Continued)

OTHER PUBLICATIONS

International Search Report in international application No. PCT/CN2010/076578, mailed on Mar. 24, 2011.

(Continued)

*Primary Examiner* — Jamal Javaid
*Assistant Examiner* — Wali Butt
(74) *Attorney, Agent, or Firm* — Oppedahl Patent Law Firm LLC

(57) ABSTRACT

The disclosure discloses a network access device and a method for enabling data forwarding between different physical mediums. The method comprises: a network access device establishing a first Point-to-Point Protocol virtual channel (PPP channel) based on a first physical medium and a second PPP channel based on a second physical medium; the network access device performing channel negotiations with the first PPP channel and with the second PPP channel respectively, and the network access device setting a relationship between the first PPP channel and the second PPP channel to be a binding relationship, when the channel negotiations of the two virtual channels succeed, to enable data forwarding between the first physical medium and the second physical medium. The disclosure can enable data forwarding quickly and efficiently. The networking mode is simple and the operation cost is low.

10 Claims, 4 Drawing Sheets

(56) References Cited

U.S. PATENT DOCUMENTS

| | | |
|---|---|---|
| 2007/0110072 A1 | 5/2007 | Elias |
| 2007/0133558 A1 | 6/2007 | Wu |
| 2007/0264997 A1* | 11/2007 | Chaudhary et al. ........ 455/426.1 |
| 2008/0013948 A1 | 1/2008 | Wang |
| 2008/0130665 A1 | 6/2008 | Xu |
| 2009/0109976 A1* | 4/2009 | Wu ............................ 370/395.5 |
| 2009/0240874 A1* | 9/2009 | Pong ............................ 711/105 |

FOREIGN PATENT DOCUMENTS

| | | | |
|---|---|---|---|
| CN | 1863150 | A | 11/2006 |
| CN | 1881914 | A | 12/2006 |
| CN | 101026546 | A | 8/2007 |
| CN | 100484074 | C * | 4/2009 |
| EP | 1750398 | A1 | 2/2007 |
| WO | 03077146 | A1 | 9/2003 |

OTHER PUBLICATIONS

English Translation of the Written Opinion of the International Search Authority in international application No. PCT/CN2010/076578, mailed on Mar. 24, 2011.

Migration to Ethernet-Based DSL Aggregation mailed on Apr. 30, 2006.

Supplementary European Search Report in European application No. 10853100.5, mailed on May 22, 2015.

* cited by examiner

METHOD AND NETWORK ACCESS DEVICE FOR ENABLING DATA FORWARDING BETWEEN DIFFERENT PHYSICAL MEDIUMS

TECHNICAL FIELD

The disclosure relates to the field of network communications, and in particular to a method and a network access device for enabling data forwarding between different physical mediums.

BACKGROUND

Point-to-Point Protocol (PPP) is a data link layer protocol for providing encapsulation and transmission of network layer packets on a point-to-point link, wherein the PPP is of a hierarchical structure (physical layer, link layer, network layer); on the underlying layer (the physical layer), it can use a synchronous medium (for example, an Integrated Services Digital Network (ISDN)/H or a synchronous Direct Dial Number (DDN) special line), as well as an asynchronous medium (for example, a Public Switched Telephone Network (PSTN)/a Gateway GPRS Support Node (GGSN) network based on Modem dial).

Since there are many types of physical mediums in the PPP protocol, it is necessary to configure corresponding interfaces for different physical mediums if data forwarding is to be enabled between different physical mediums, it will consequently result in many types of interfaces of central-office devices, complex networking environment and increase of operation cost.

SUMMARY

The main technical problem to be solved by the disclosure is to provide a method and a network access device for enabling data forwarding between different physical mediums, with simple implementation manner and high efficiency of data forwarding.

In order to solve the above technical problem, the disclosure provides the following technical solutions:

a method for enabling data forwarding between different physical mediums is provided, which include the following steps:

a network access device establishes a first Point-to-Point Protocol virtual channel (PPP channel) based on a first physical medium and a second PPP channel based on a second physical medium;

the network access device performs channel negotiations with the first PPP channel and the second PPP channel respectively, and sets a relationship between the first PPP channel and the second PPP channel to be a binding relationship when the channel negotiations of the two virtual channels succeed, to enable data forwarding between the first physical medium and the second physical medium.

In an embodiment of the method of the disclosure, the network access device enables data forwarding between the first physical medium and the second physical medium through a core transceiving process.

The core transceiving process may include that:

a first physical medium core of the network access device converts message data in a form of a first physical medium encapsulation transmitted from a first physical medium drive into message data in a form of a second physical medium encapsulation, and transmits the converted message data to a second physical medium core through the bound first PPP channel and second PPP channel; the second physical medium core transmits the message data in the form of the second physical medium encapsulation to a second physical medium drive; and, a second physical medium core of the network access device converts the message data in the form of the second physical medium encapsulation transmitted from a second physical medium drive into the message data in the form of the first physical medium encapsulation, and transmits the converted message data to a first physical medium core through the bound second PPP channel and first PPP channel; the first physical medium core transmits the message data in the form of the first physical medium encapsulation to the first physical medium drive.

In an embodiment of the method of the disclosure, the first physical medium is an Ethernet network of an Integrated Services Digital Network (ISDN) medium; the first PPP channel is a Point-to-Point Protocol over an Ethernet (PPPoE) channel; wherein the second physical medium is a Gateway GPRS Support Node (GGSN) network based on Modem dial; wherein the second PPP channel is a Point-to-Point Protocol over a Teletypewriter (PPPoTTY) channel; wherein the core transceiving process includes a core transmitting process and a core receiving process.

the core transmitting process includes that:

an Ethernet drive of the network access device transmits the received PPPoE encapsulated message data from a first physical medium side to a core protocol stack; the core protocol stack sends the PPPoE encapsulated message data to a PPPoE core according to a type of registered protocol;

the PPPoE core removes a message header of the PPPoE encapsulated message data, and transmits the PPPoE encapsulated message data without the message header to the PPPoTTY channel of a PPPoTTY core through the PPPoE channel according to the binding relationship; the PPPoTTY core transmits the PPPoE encapsulated message data without the message header to an underlying USB drive, which then transmits the data to a second physical medium side.

The core receiving process includes that:

the underlying USB drive receives a data message returned from the second physical medium side, and transmits the data message to the PPPoTTY core;

the PPPoTTY core transmits the received data message to the PPPoE channel of the PPPoE core through the PPPoTTY channel according to the binding relationship; the PPPoE core transmits the data message to the Ethernet drive after adding a message header to the data message, which is then transmitted to the first physical medium side through the Ethernet.

In an embodiment of the method of the disclosure, the core protocol stack acquires the type of registered protocol from a unified packet receiving function netif_receive_skb of the protocol stack.

In an embodiment of the method of the disclosure, the first physical medium side may be a Personal Computer (PC) side and the second physical medium side may be an internet side.

In an embodiment of the method of the disclosure, the data forwarding process between the first physical medium and the second physical medium may include that:

a PC initiates a PPPoE dial and starts a negotiation of PPPoE Discover stage;

the PC transmits a PADI message request to the network access device;

the network access device returns a PADO message;

the PC initiates a PADR request message to the network access device;

the network access device returns a PADS message; wherein a PPPoE channel is established successfully, the network access device enters the PDP activation stage;

the network access device transmits an AT instruction to the GGSN network;

the network access device receives an AT instruction returned from the GGSN network; wherein PDP Context negotiation is successful and the PPPoTTY channel is established;

the network access device sets the PPPoE channel and the PPPoTTY channel to be a binding relationship, wherein the PC enters a PPPoE Session stage;

the PC initiates a PPP stage control message;

the network access device receives a PPPoE message through the PPPoE channel, removing the PPPoE message header and directly transmits the PPP message to the bound PPPoTTY channel;

the network access device receives a PPP message returned by the PPPoTTY channel from the internet side, directly transmits the returned PPP message to the bound PPPoE channel transparently, which is encapsulated with a PPPoE header and then transmitted to the PC;

the PC accesses Internet resources via PPPoE dial after a PPP link is established successfully;

the PPPoE/PPPoTTY channel is destroyed and the binding relationship of channel is cleared, when the PPP link is disconnected.

In an embodiment of the method of the disclosure, the first physical medium may be an Ethernet network of an ISDN medium; the first PPP channel may be a PPPoE channel.

In an embodiment of the method of the disclosure, the second physical medium may be a GGSN network based on Modem dial; the second PPP channel may be a PPPoTTY channel.

In an embodiment of the method of the disclosure, the network access device may be a home gateway.

The disclosure further provides a network access device for enabling data forwarding between different physical mediums, which includes a channel establishment module and a channel management module.

The channel establishment module is configured to establish a first PPP channel based on a first physical medium and to establish a second PPP channel based on a second physical medium.

The channel management module is configured to set a relationship between the first PPP channel and the second PPP channel to be a binding relationship, when the channel negotiations of the first PPP channel and the second PPP channel succeed, to enable data forwarding between the first physical medium and the second physical medium.

By setting a network access device supporting the access of different physical mediums, the disclosures can realize the access of different physical mediums by using the network access device. During an accessing process, by establishing PPP channels respectively based on different physical mediums of two access ends and setting the two PPP channels to be a binding relationship, the disclosure can enable data forwarding between different physical mediums fast and efficient by using a binding forwarding mode of bridging principle; besides, according to the disclosure, the networking mode is simple and the operation cost is low.

DETAILED DESCRIPTION

The disclosure is further illustrated below in detail with reference to embodiments in conjunction with accompanying drawings.

The disclosure provides a data forwarding method, which enables a user in the scene of a physical medium at one end (the first physical medium) to access the resources in a different physical medium at the other end (the second physical medium) via a network access device, for example, a home gateway or other devices capable of network accessing. The data forwarding method can also make the data forwarding as efficient as possible. The embodiments of the disclosure are described below by taking a home gateway for example.

A home gateway is located between network A and network B that are of different physical mediums and provides capabilities of accessing networks A and B respectively based on PPP protocol. The home gateway simultaneously establishes PPP channels based on physical mediums of A and B (that is, the first physical medium and the second physical medium) and performs the channel negotiations of the two channels. To be distinguished, the virtual channel established based on the first physical medium is called the first PPP channel and the virtual channel established based on the second physical medium is called the second PPP channel.

After two channels are negotiated successfully, the two channels are set to be a binding relationship. The subsequent PPP stage messages (including PPP control message and PPP data message) of network segments A, B are transmitted to the channel at the opposite end transparently through the home gateway without being changed. The home gateway would not parse the message of the PPP stage, instead, the home gateway will use a binding forwarding mode of bridging principle to enable data forwarding between end A and end B so as to forward data fast and efficiently.

After PPP is negotiated successfully, the terminal users of end A and end B can access the resources in the physical medium network at the opposite end mutually.

Figure 1:
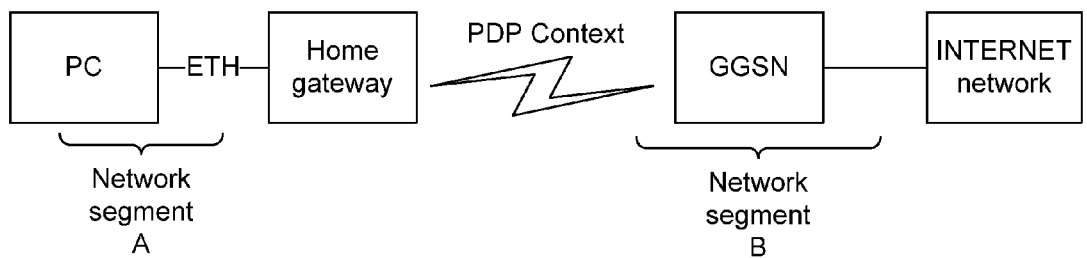
FIG. 1 shows a networking diagram according to the embodiment of the disclosure.
Figure 2:
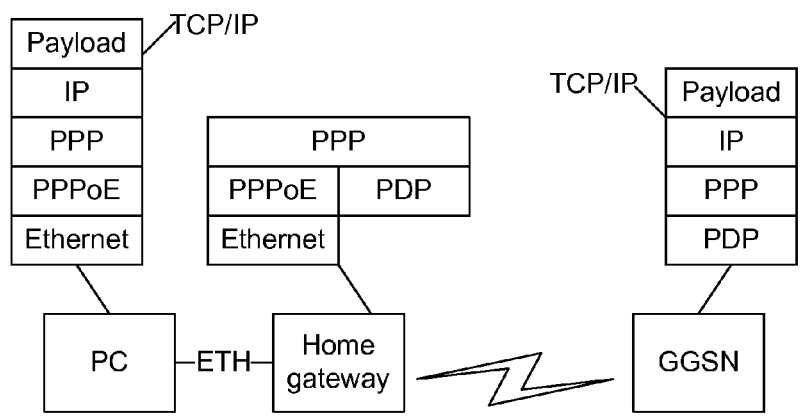
FIG. 2 shows a diagram of a format relationship of accessed data of a home gateway according to the embodiment of the disclosure.

For the data forwarding in an embodiment of the disclosure, the networking environment is as shown in FIG. 1, network segment A is an Ethernet network of an ISDN medium and a Personal Computer (PC) is connected to the Ethernet network; network segment B is a GGSN network based on Modem dial and the GGSN network is connected to the Internet network. It should be understood that FIG. 1 only shows the networking environment by way of illustration, in which both A and B can be any physical mediums supporting PPP. In the networking environment as shown in FIG. 1, the format of the accessed data is as shown in FIG. 2, for example, the accessed data of the home gateway includes a PPPoE message, a PDP message, an Ethernet message, etc.

Figure 3:
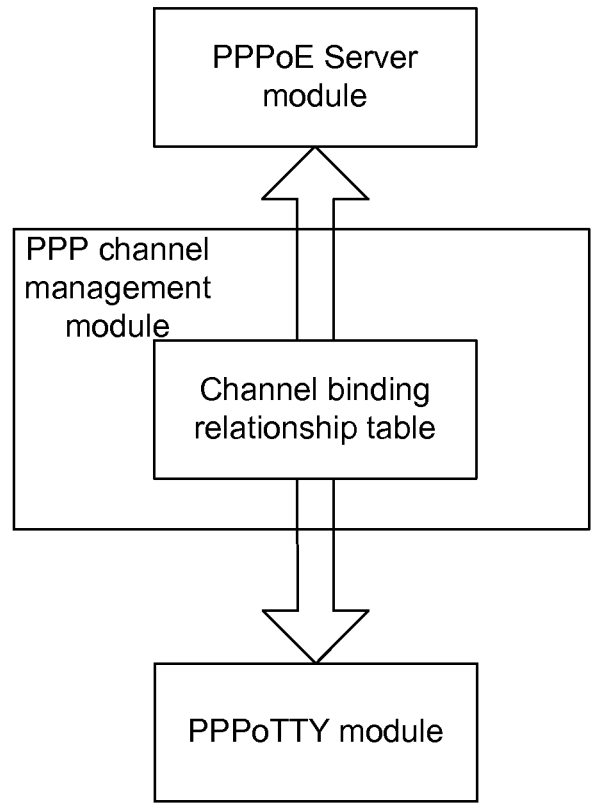
FIG. 3 shows a diagram of a relationship between modules of a home gateway according to the embodiment of the disclosure.
Figure 4:
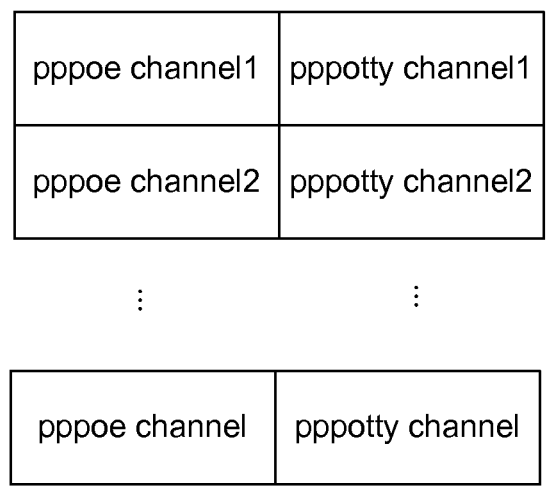
FIG. 4 shows a schematic diagram of internal data storage according to the embodiment of the disclosure.

FIG. 3 shows a diagram of a relationship between modules of a home gateway according to the embodiment of the disclosure. As shown in FIG. 3, in the embodiment, the home gateway mainly includes a PPPoE Server module and a PPPoTTY module that are configured to establish a PPPoE channel and a PPPoTTY channel respectively. The home gateway may further include a PPP channel management module configured to manage a channel binding relationship table that is as shown in FIG. 4.

Figure 5:
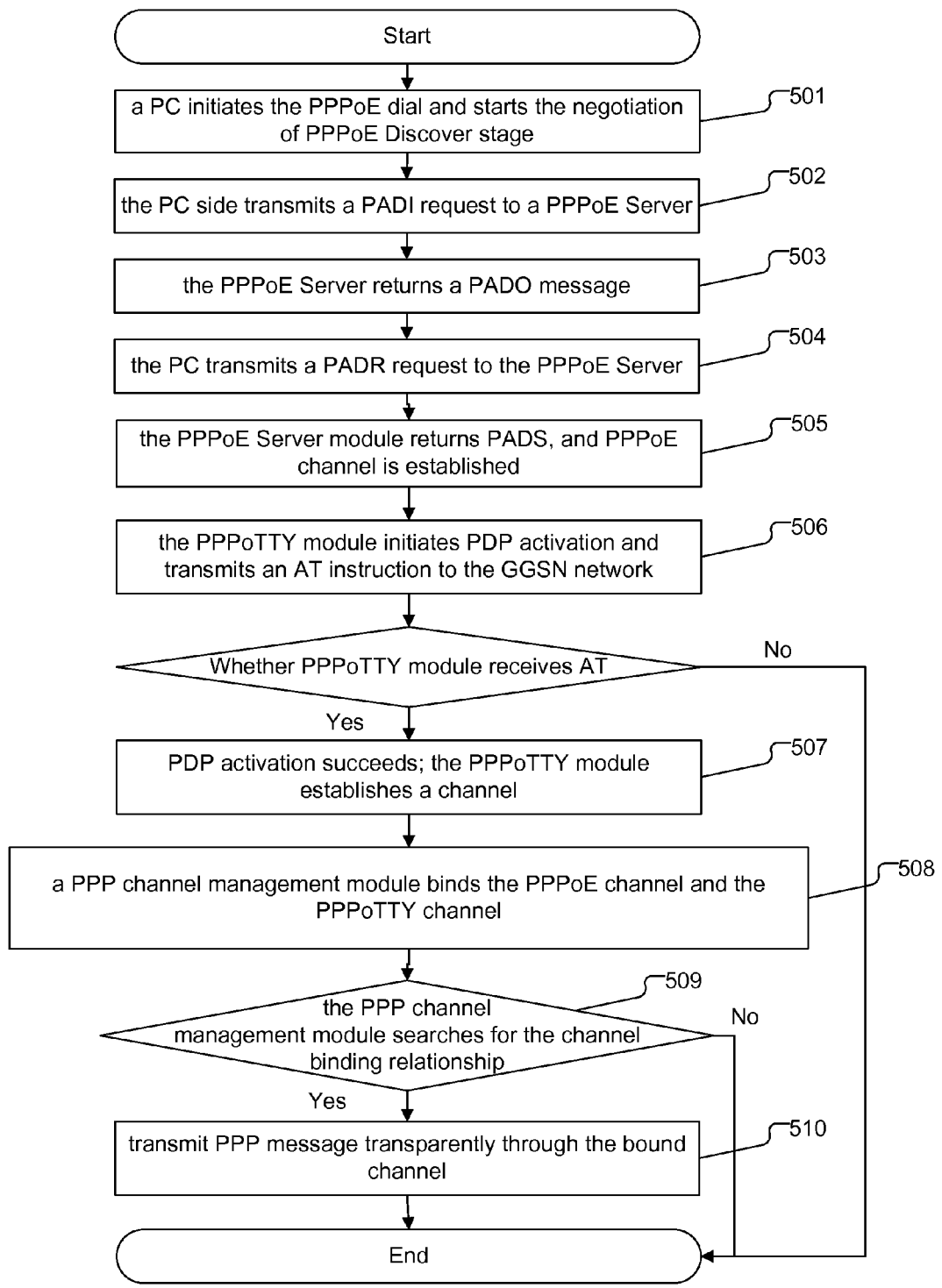
FIG. 5 shows a processing flowchart according to the embodiment of the disclosure.

FIG. 5 shows a processing flowchart according to the embodiment of the disclosure. As shown in FIG. 5, the process flow of data forwarding of the embodiment of the disclosure includes the following steps:

Step 501: A PC initiates the PPPoE dial and starts a negotiation of PPPoE Discover stage.

Step 502: The PC transmits a PADI message request to the home gateway (for example, a PPPoE Server).

Step 503: The home gateway returns a PADO message.

Step 504: The PC transmits a PADR request message to the home gateway.

Step 505: The home gateway returns a PADS message, and a PPPoE channel is established successfully.

Step 506: The home gateway enters a PDP activation stage and transmits an AT instruction to the GGSN network.

Step 507: The home gateway receives the AT instruction returned from the GGSN network; PDP Context negotiation is successful and the PPPoTTY channel is established;

Step 508: The home gateway sets the PPPoE channel and the PPPoTTY channel to be a binding relationship; for example, as shown in FIG. 4, the PPPoE channel 1 is bound with the PPPoTTY channel 1, the PPPoE channel 2 is bound with the PPPoTTY channel 2, etc.

Step 509: The PC enters a PPPoE Session stage and initiates a PPP stage control message; the PPP channel management module searches the channel binding relationship.

Step 510: According to the searched binding relationship, PPP message is transmitted transparently through the bound channel.

Generally, the home gateway receives a message through the PPPoE channel, removes the PPPoE message header and directly transmits the PPP message to the bound PPPoTTY channel.

Generally, the home gateway receives a message through the PPPoTTY channel, directly transmits the PPP message to the bound PPPoE channel transparently, which is encapsulated with a PPPoE header and then is transmitted to the PC.

Generally, after a PPP link is established successfully, the PC accesses Internet resources normally through PPPoE dial.

Generally, when the PPP link is disconnected, the PPPoE/PPPoTTY destroys the channel; meanwhile the home gateway clears the binding relationship of channel.

Figure 6:
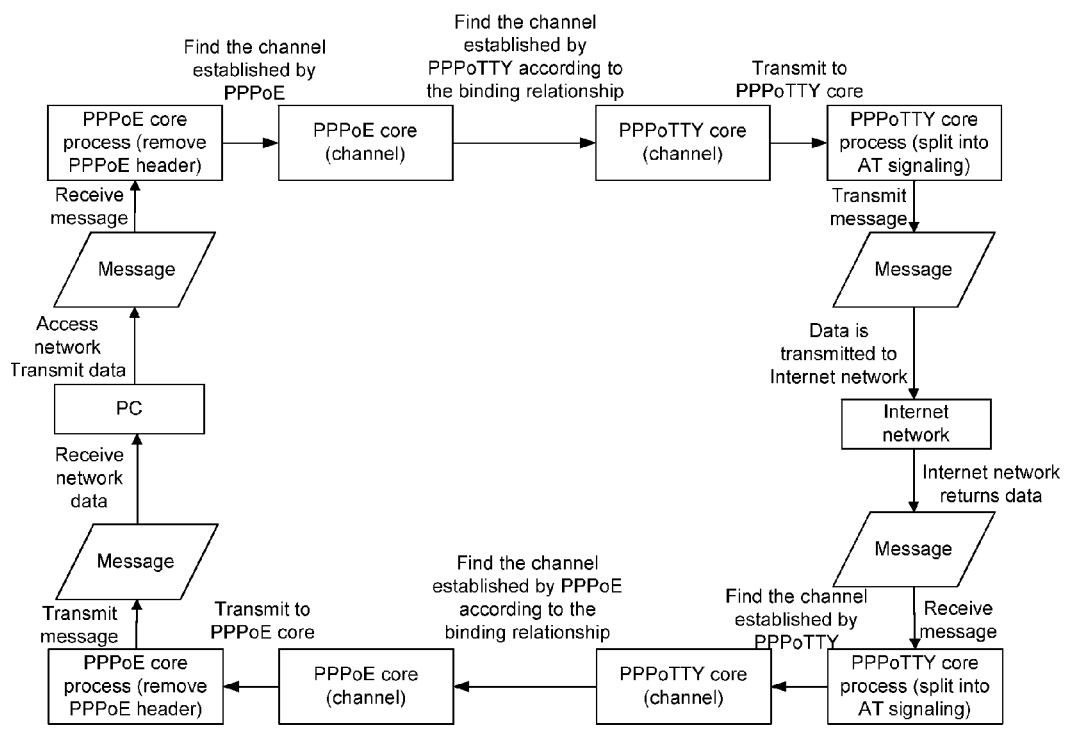
FIG. 6 shows a transceiving flowchart of a message in a core according to the embodiment of the disclosure.

The core content of the disclosure is the processing of the PPP core. The transceiving process of data in the core of a home gateway device after a link is established successfully is described below. As shown in FIG. 6, the flow includes the following steps:

When the PC accesses the network, data is transmitted to the home gateway device.

After receiving the message data sent from the PC, the Ethernet drive of the home gateway device transmits the received message data to the core protocol stack; after receiving the message, the core protocol stack distributes the message according to the type of registered protocol in the unified packet receiving function netif_receive_skb of the protocol stack.

The PPPoE core registers 0x8864 type of Discovery Session stage message, thus, the PPPoE encapsulated data sent by the PC is processed by the PPPoE core.

The PPPoE core removes the PPPoE message header of the data and transmits the data to the established PPP core channel (PPPoE channel).

According to the channel binding relationship, the PPPoE core learns that the channel bound with the PPPoE channel is established by the PPPoTTY.

The data is directly transmitted to the channel established by the PPPoTTY (PPPoTTY channel), then is transmitted by the PPPoTTY channel to the PPPoTTY core, and finally transmitted by the underlying USB drive corresponding to the PPPoTTY to the Internet side.

The underlying USB drive receives the data message returned by the Internet and then transmits the data message to the PPPoTTY core.

After further processing the data message, the PPPoTTY core transmits the processed data message to the established PPP core channel (PPPoTTY channel).

According to the binding relationship table, the PPPoTTY core learns that the channel bound with the PPPoTTY channel is established by the PPPoE.

The data is directly transmitted to the channel established by the PPPoE (PPPoE channel), then is transmitted by the PPPoE channel to the PPPoE core. After adding a PPPoE message header to the data, the PPPoE core transmits the data to the underlying Ethernet drive for further transmitting.

The PC receives the response data sent by the gateway device.

The network access device of the embodiment of the disclosure can be implemented in a form of software or hardware, and the specific implementation form is not limited. For example, the network access device of one implementation form includes a channel establishment module and a channel management module.

The channel establishment module is configured to establish a first PPP channel based on a first physical medium and to establish a second PPP channel based on a second physical medium.

The channel management module is configured to set the relationship of the first PPP channel and the second PPP channel to be a binding relationship, when the channel negotiations of the first PPP channel and the second PPP channel succeed, to enable data forwarding between the first physical medium and the second physical medium.

The network access device enables the data forwarding between the first physical medium and the second physical medium through a core transceiving process.

The core transceiving process mainly includes the following steps:

A first physical medium core converts the message data in a form of a first physical medium encapsulation transmitted from a first physical medium drive into message data in a form of a second physical medium encapsulation, and transmits the converted message data to a second physical medium core through the bound first PPP channel and second PPP channel; then the second physical medium core transmits the message data in the form of the second physical medium encapsulation to a second physical medium drive.

Similarly, a second physical medium core converts the message data in the form of the second physical medium encapsulation transmitted from the second physical medium drive into the message data in the form of the first physical medium encapsulation, and transmits the converted message data to the first physical medium core through the bound second PPP channel and first PPP channel; then the first physical medium core transmits the message data in the form of the first physical medium encapsulation to the first physical medium drive.

In the example shown in FIG. 6, the first physical medium is an Ethernet network of an ISDN medium; the first PPP channel is a PPPoE channel and is set at the PC side; the second physical medium is a GGSN network based on Modem dial; the second PPP channel is a PPPoTTY channel and is set at the internet side. As mentioned above, the first physical medium and the second physical medium are not limited to these embodiments, and can be any physical mediums supporting PPP protocol; and the type of the physical medium can be set randomly at the PC side as well as the internet side.

The disclosure can enable the efficient interconnection and intercommunication among devices in different physical medium networks by using the access capability (Ethernet access, ATM access, Modem dial access, etc) of the network access device, such as a home gateway, over the present supported physical network and by using the present PPP network resources without any extra physical devices. The technical solution has the following advantages:

a) With the existing network interface of the PPP channel and the existing PPP hierarchical technology, the disclosure can enable data forwarding fast and efficient by adopting the binding forwarding mode of bridging principle.

b) Binding is performed by a unified channel without paying any attention to some private features of the channel, such as a Session ID (session identifier) of a PPPoE, a Permanent Virtual Circuit (PVC) of a Point Protocol over Asynchronous Transfer Mode (PPPoA), etc.

c) The message of PPP stage can be forwarded directly without being processed, which simplified the process.

d) The core module interface is simple, which can be expanded easily.

The disclosure can realize the simplification of a terminal user accessing network, thus, any network can be accessed. The networking environment of a central-office device Broadband Access Server (BAS) is simplified, the use of interface of the central-office device is reduced, and the operation cost is also reduced.

The above content is a further illustration of the disclosure in conjunction with specific implementation, which cannot be considered that the specific implementation of the disclosure is limited to the above description. For those skilled in the art, some simple deductions and replacements can be made without departing from the idea of the disclosure; the deductions and replacements shall be deemed to be included within the protection scope of the disclosure.

The invention claimed is:

1. A method for enabling data forwarding between different physical mediums, comprising:
    establishing, by a network access device, a first Point-to-Point Protocol virtual channel (PPP channel) based on a first physical medium and a second PPP channel based on a second physical medium;
    performing, by the network access device, channel negotiations with the first PPP channel and the second PPP channel respectively; and
    binding the first PPP channel with the second PPP channel indirectly without paying any attention to private features of the first PPP channel and the second PPP channel, and setting a relationship between the first PPP channel and the second PPP channel to be a binding relationship, when the channel negotiations of the two virtual channels succeed, to enable data forwarding between the first physical medium and the second physical medium; wherein, according to the binding relationship, PPP message is not parsed and transmitted transparently by adopting a binding forwarding mode of bridging principle;
    wherein the network access device enables the data forwarding between the first physical medium and the second physical medium through a core transceiving process, which comprises:
    converting, by a first physical medium core of the network access device, message data in a form of a first physical medium encapsulation transmitted from a first physical medium drive into message data in a form of a second physical medium encapsulation, and transmitting the converted message data to a second physical medium core through the bound first PPP channel and second PPP channel; transmitting, by the second physical medium core, the message data in the form of the second physical medium encapsulation to a second physical medium drive; or
    converting, by the second physical medium core of the network access device, message data in the form of the second physical medium encapsulation transmitted from the second physical medium drive into message data in the form of the first physical medium encapsulation, and transmitting the converted message data to the first physical medium core through the bound second PPP channel and first PPP channel; transmitting, by the first physical medium core, the message data in the form of the first physical medium encapsulation to the first physical medium drive.

2. The method according to claim 1, wherein the first physical medium is an Ethernet network of an Integrated Services Digital Network (ISDN) medium and the first PPP channel is a Point-to-Point Protocol over an Ethernet (PPPoE) channel;
    wherein the second physical medium is a Gateway GPRS Support Node (GGSN) network based on Modem dial and the second PPP channel is a Point-to-Point Protocol over a Teletypewriter (PPPoTTY) channel;
    wherein the core transceiving process includes a core transmitting process and a core receiving process,
    the core transmitting process comprises:
        transmitting, by an Ethernet drive of the network access device, the received PPPoE encapsulated message data from a first physical medium side to a core protocol stack; sending, by the core protocol stack, the PPPoE encapsulated message data to a PPPoE core according to a type of registered protocol;
        removing, by the PPPoE core, a message header of the PPPoE encapsulated message data; transmitting the PPPoE encapsulated message data without the message header to the PPPoTTY channel of a PPPoTTY core through the PPPoE channel according to the binding relationship; transmitting, by the PPPoTTY core, the PPPoE encapsulated message data without the message header to an underlying USB drive, which then transmits the data to a second physical medium side;
    the core receiving process comprises:
        receiving, by the underlying USB drive, a data message returned from the second physical medium side, and transmitting the data message to the PPPoTTY core;
        transmitting, by the PPPoTTY core, the received data message to the PPPoE channel of the PPPoE core through the PPPoTTY channel according to the binding relationship; transmitting, by the PPPoE core, the data message to the Ethernet drive after adding a message header to the data message, which is then transmitted to the first physical medium side through the Ethernet.

3. The method according to claim 2, wherein the sending the PPPoE encapsulated message data to the PPPoE core according to the type of registered protocol comprises:
acquiring, by the core protocol stack, the type of registered protocol from a unified packet receiving function netif_receive_skb of the protocol stack; and
sending, by the core protocol stack, the PPPoE encapsulated message data to the PPPoE core according to the type of registered protocol.

4. The method according to claim 2, wherein the first physical medium side is a Personal Computer (PC) side and the second physical medium side is an internet side.

5. The method according to claim 4, comprising:
initiating, by a PC, a PPPoE dial and starting a negotiation of PPPoE Discover stage;
transmitting, by the PC, a PADI message request to the network access device;
returning, by the network access device, a PADO message;
initiating, by the PC, a PADR request message to the network access device;
returning, by the network access device, a PADS message, wherein a PPPoE channel is established successfully;
transmitting, by the network access device that enters a PDP activation stage, an AT instruction to the GGSN network;
receiving, by the network access device, an AT instruction returned from the GGSN network, wherein PDP Context negotiation is successful and the PPPoTTY channel is established;
setting, by the network access device, the PPPoE channel and the PPPoTTY channel to be a binding relationship, wherein the PC enters a PPPoE Session stage;
initiating, by the PC, a PPP stage control message;
receiving, by the network access device, a PPPoE message through the PPPoE channel, removing a PPPoE message header and directly transmitting a PPP message to the bound PPPoTTY channel;
receiving, by the network access device, a PPP message returned by the PPPoTTY channel from the internet side, directly transmitting the returned PPP message to the bound PPPoE channel transparently by adopting the binding forwarding mode of bridging principle, which is encapsulated with a PPPoE header and then is transmitted to the PC;
accessing, by the PC, Internet resources via PPPoE dial after a PPP link is established successfully;
destroying the PPPoE/PPPoTTY channel and clearing the binding relationship of channel, when the PPP link is disconnected.

6. The method according to claim 1, wherein the first physical medium is an Ethernet network of an ISDN medium and the first PPP channel is a PPPoE channel.

7. The method according to claim 1, wherein the second physical medium is a GGSN network based on Modem dial and the second PPP channel is a PPPoTTY channel.

8. The method according to claim 1, wherein the network access device is a home gateway.

9. A network access device, comprising:
a memory including instructions stored on, which when executed, cause a processor to perform operations to:
establish a first Point-to-Point Protocol virtual channel (PPP channel) based on a first physical medium and to establish a second PPP channel based on a second physical medium;
perform channel negotiations with the first PPP channel and the second PPP channel respectively;
bind the first PPP channel with the second PPP channel indirectly without paying any attention to private features of the first PPP channel and the second PPP channel;
set a relationship between the first PPP channel and the second PPP channel to be a binding relationship, when channel negotiations of the first PPP channel and the second PPP channel succeed, to enable data forwarding between the first physical medium and the second physical medium; according to the binding relationship, PPP message is not parsed and transmitted transparently by adopting a binding forwarding mode of bridging principle;
wherein the network access device enables the data forwarding between the first physical medium and the second physical medium through a core transceiving process, which comprises:
converting, by a first physical medium core of the network access device, message data in a form of a first physical medium encapsulation transmitted from a first physical medium drive into message data in a form of a second physical medium encapsulation, and transmitting the converted message data to a second physical medium core through the bound first PPP channel and second PPP channel; transmitting, by the second physical medium core, the message data in the form of the second physical medium encapsulation to a second physical medium drive; or
converting, by the second physical medium core of the network access device, message data in the form of the second physical medium encapsulation transmitted from the second physical medium drive into message data in the form of the first physical medium encapsulation, and transmitting the converted message data to the first physical medium core through the bound second PPP channel and first PPP channel; transmitting, by the first physical medium core, the message data in the form of the first physical medium encapsulation to the first physical medium drive.

10. The method according to claim 2, wherein the network access device is a home gateway.

* * * * *